March 11, 1947.   L. A. HEINTZELMAN   2,417,360
VAVLE CORE REMOVER
Filed May 22, 1945
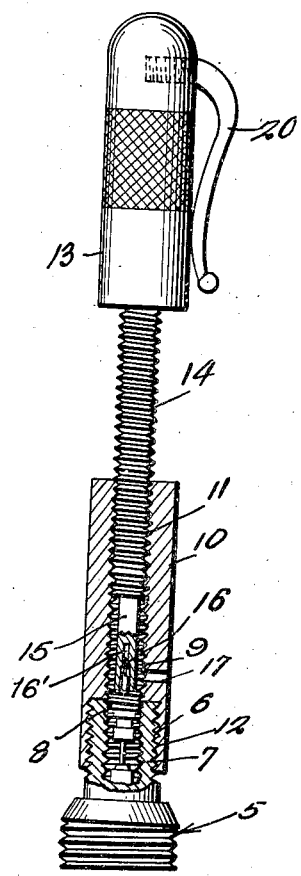
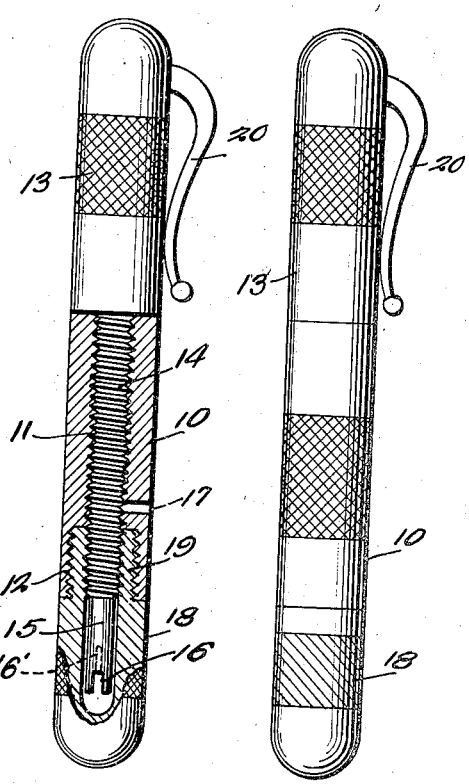
Inventor
Leo A. Heintzelman
By Clarence A. O'Brien
and Harvey B. Jacobson
Attorneys Patented Mar. 11, 1947

2,417,360

UNITED STATES PATENT OFFICE 2,417,360

VALVE CORE REMOVER

Leo A. Heintzelman, Grand Rapids, Mich.

Application May 22, 1945, Serial No. 595,092

2 Claims. (Cl. 81—3)

When it becomes necessary to repair the inner tube of a pneumatic vehicle wheel tire, it is the usual practice to quickly deflate the inner tube by removing the core or check valve assembly from the casing or stem of the inflation valve of the inner tube. The primary object of the present invention is to provide a simple, compact and efficient tool by means of which the core or check valve assembly of an inflation valve may be easily and quickly removed from the casing or stem of the inflation valve.

A more specific object of the present invention is to provide a tool of the above kind which will afford a symmetrical and compact unit which may be conveniently carried in and clipped to the pocket of a garment when not in use.

A further object of the invention is to provide a tool of the above kind which requires, in its use, no manual effort in maintaining the tool engaged with the valve stem of the core or check valve assembly when removing the latter from the stem of the inflation valve.

Other features of the invention, as well as the exact nature thereof, will become apparent from the following description when considered in connection with the accompanying drawing.

In the drawing:

Figure 1 is a side elevational view of a valve core remover constructed in accordance with the present invention.

Figure 2 is a view of the tool shown in Figure 1, partly in side elevation and partly broken away and in central longitudinal section.

Figure 3 is a view somewhat similar to Figure 2, but showing the tool in use with the valve core in partially removed position with respect to the stem of the inflation valve.

Referring in detail to the drawing, 5 indicates the stem or casing of a conventional inflation valve such as is commonly used in connection with the inner tube of a pneumatic tire for vehicle wheels. As usual, this stem or casing 5 has a major portion of relatively large diameter and externally threaded to receive a jamb nut by means of which the stem is retained in position projecting through the rim of the vehicle wheel. Also, the free end of the valve stem 5 is of reduced diameter and externally threaded to receive a valve cap, as indicated at 6. Stem 5 has a threaded bore 7 into which is removably threaded the casing of a core or check valve assembly 8 whose sliding and non-rotatable valve member has a projecting stem 9. The check valve stem 9 is of flattened form so that it may be effectively engaged and rotated to thread the assembly 8 out of the stem 5 of the inflation valve or into the same.

The present invention contemplates the provision of an improved tool for readily and expeditiously removing the assembly 8 from the stem 5 when it is desired to quickly deflate the inner tube provided with the inflation valve. As shown, the present tool includes an elongated tubular barrel 10 having an axial bore provided with threads at 11 corresponding to the internal threads at 7 in the stem 5 of the inflation valve. The lower end of the barrel 10 is counterbored and internally threaded, as at 12, so as to be removably screwed upon the reduced end 6 of the stem 5 when the usual valve cap is removed therefrom.

The tool further includes an elongated externally knurled handle 13 of a diameter corresponding to that of the barrel 10 and provided at its lower end with a projecting axial threaded stem 14 adapted to be adjustably screwed through the barrel 10. The lower end portion of stem 14 is of smooth form and reduced diameter, as indicated at 15, and this reduced end portion 15 is provided with a kerf 16 and has an axial socket 16' adapted for snug reception of the check valve stem 9 of the assembly 8. When the stem 9 is engaged in socket 16, a driving connection is provided between said stem 9 and the stem 14 of the tool by the usual wings of stem 9 engaged in the kerf 16.

In use, the barrel 10 is threaded upwardly on stem 14 until it engages the handle 13, at which time the lower end 15 of stem 14 projects below the barrel 10. This end portion 15 is inserted in the upper end of stem 5 so that the check valve stem 9 is engaged in socket 16' and the wings of stem 9 are engaged in kerf 16. Barrel 10 is then threaded downwardly on stem 14 and screwed onto the reduced end 6 of the stem 5, as shown in Figure 3. Handle 13 and stem 14 are then rotated in the proper direction to thread the assembly 8 out of the stem 5 and into the barrel 10 above its counterbored lower end portion. The tool may then be removed from the stem 5 by threading the barrel 10 off of the latter, the assembly 8 being retained in the barrel 10 so that it will not become readily misplaced or lost. Obviously, by then turning stem 14 in the opposite direction, the assembly 8 may be threaded out of the lower end of barrel 10 into the hand or back into the stem 5.

The barrel 10 is preferably provided through one side and directly above the counterbore 12 with a transverse vent opening 17 so that air may escape from the inflation valve as soon as the assembly 8 is threaded into the bore 11 of barrel 10 above said vent opening 17. Of course, when the barrel 10 is threaded off of the stem 5, the air will be allowed to more rapidly escape from the inner tube.

When the tool is not in use, the barrel 10 is preferably threaded upwardly on stem 14 into contact with the lower end of handle 13. At this time, the reduced lower end 15 of stem 14 projects below the barrel 10 and is encased by a removable cap 18 having a threaded stem 19 adapted to screw into the counterbore 12 of the barrel 10. The body portion of cap 18 is of the same diameter as barrel 10 so that when the parts are assembled, as shown in Figure 1, they provide an elongated or slender assembly of uniform diameter from end to end that may be readily carried in the pocket of a garment. A suitable spring clip 20 may be provided on the handle 13 for engagement with the pocket so as to retain the tool in the latter in a manner similar to that in which fountain pens and the like are commonly retained in garment pockets. The adjacent ends of the cap 18, barrel 10 and handle 13 flatly abut each other so as to present a continuous smooth surface when the device is assembled, as shown in Figure 1.

From the foregoing description, it is believed that the construction, manner of use and advantages of the present invention will be readily understood and appreciated by those skilled in the art.

What I claim is:

1. A tool for removing, from the casing of an inflation valve, a check valve assembly removably threaded into said casing, including an elongated barrel having an axial bore whose wall is threaded to correspond to the thread in the casing engaged by said assembly, said barrel further having a counterbore at its lower end whose wall is threaded to screw onto the upper end of the casing, an elongated handle, an elongated axial threaded stem on the lower end of the handle having adjustable threaded engagement in the bore of the barrel and provided with a reduced lower end portion adapted to freely enter the casing and formed with a kerf for driving engagement with the check valve stem of the assembly, said threaded stem being longer than the barrel so that its reduced end portion will project below the barrel for engagement with the check valve stem when the barrel is adjusted toward the handle, said barrel being adjustable partially off of the threaded stem for threading onto the casing so as to maintain the threaded stem in engagement with the check valve stem while screwing the assembly out of the casing by turning the handle.

2. The construction defined in claim 1, wherein the handle and barrel are of similar external diameter and wherein the barrel is adjustable onto the stem to such an extent as to engage the upper end of said barrel with the lower end of the handle and to project the lower end of the stem below the lower end of the barrel, and a removable cap for enclosing the lower end of the threaded stem when projected below the lower end of the barrel, said cap being of the same external diameter as the barrel and including a threaded neck detachably screwed into the counterbore of the barrel.

LEO A. HEINTZELMAN.

REFERENCES CITED

The following references are of record in the file of this patent:

UNITED STATES PATENTS

| Number | Name | Date |
|---|---|---|
| 1,091,839 | Haverfield | Mar. 31, 1914 |
| 2,026,926 | Williams | Jan. 7, 1936 |
| 1,995,419 | Gerard | Apr. 17, 1934 |
| 2,110,999 | Miga | Mar. 15, 1938 |
| 2,054,138 | Sandell | Sept. 15, 1936 |